H. T. NEWBIGIN.
LUBRICATION OF JOURNAL BEARINGS.
APPLICATION FILED NOV. 21, 1918.
1,336,373.
Patented Apr. 6, 1920.
2 SHEETS—SHEET 1.
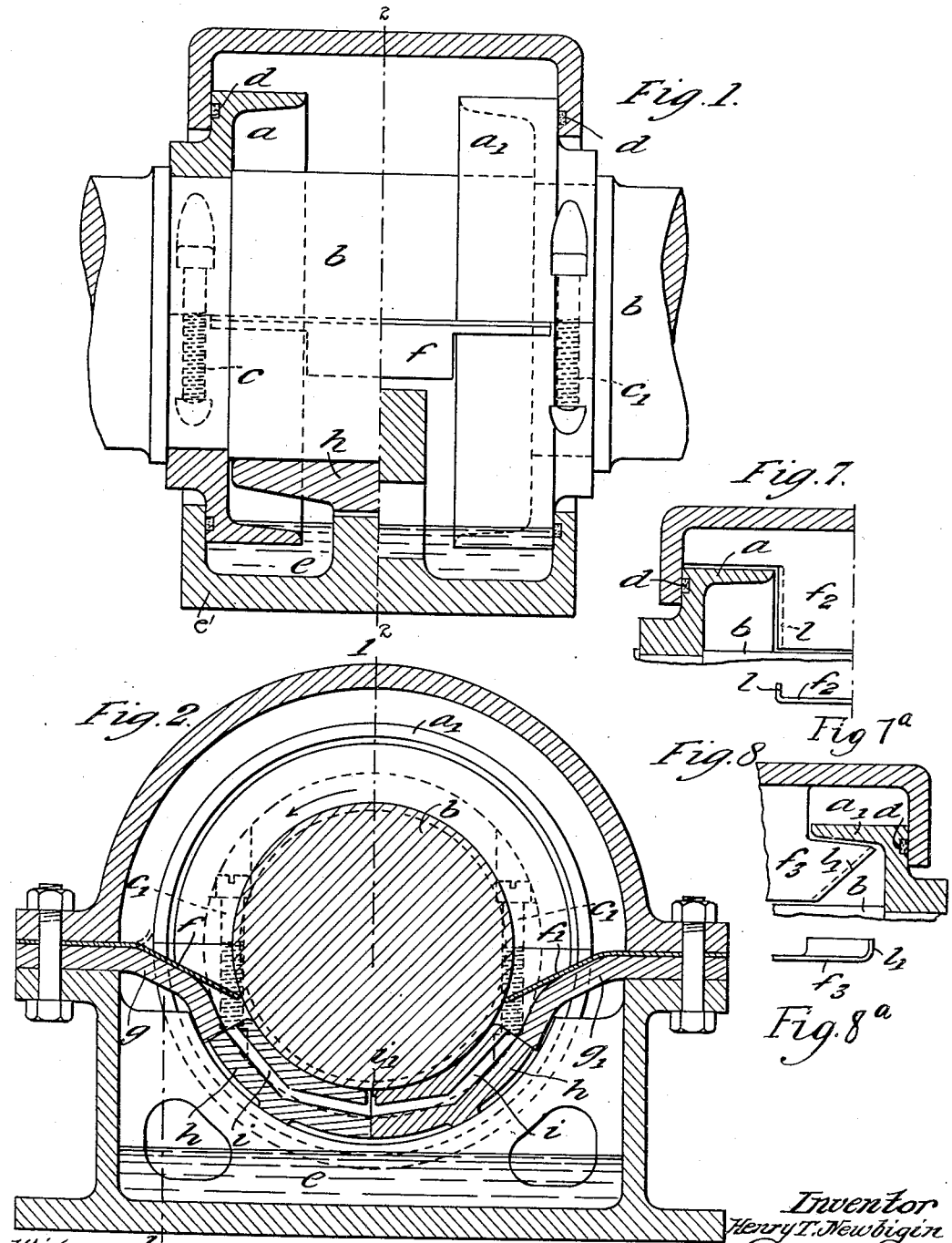
Inventor
Henry T. Newbigin

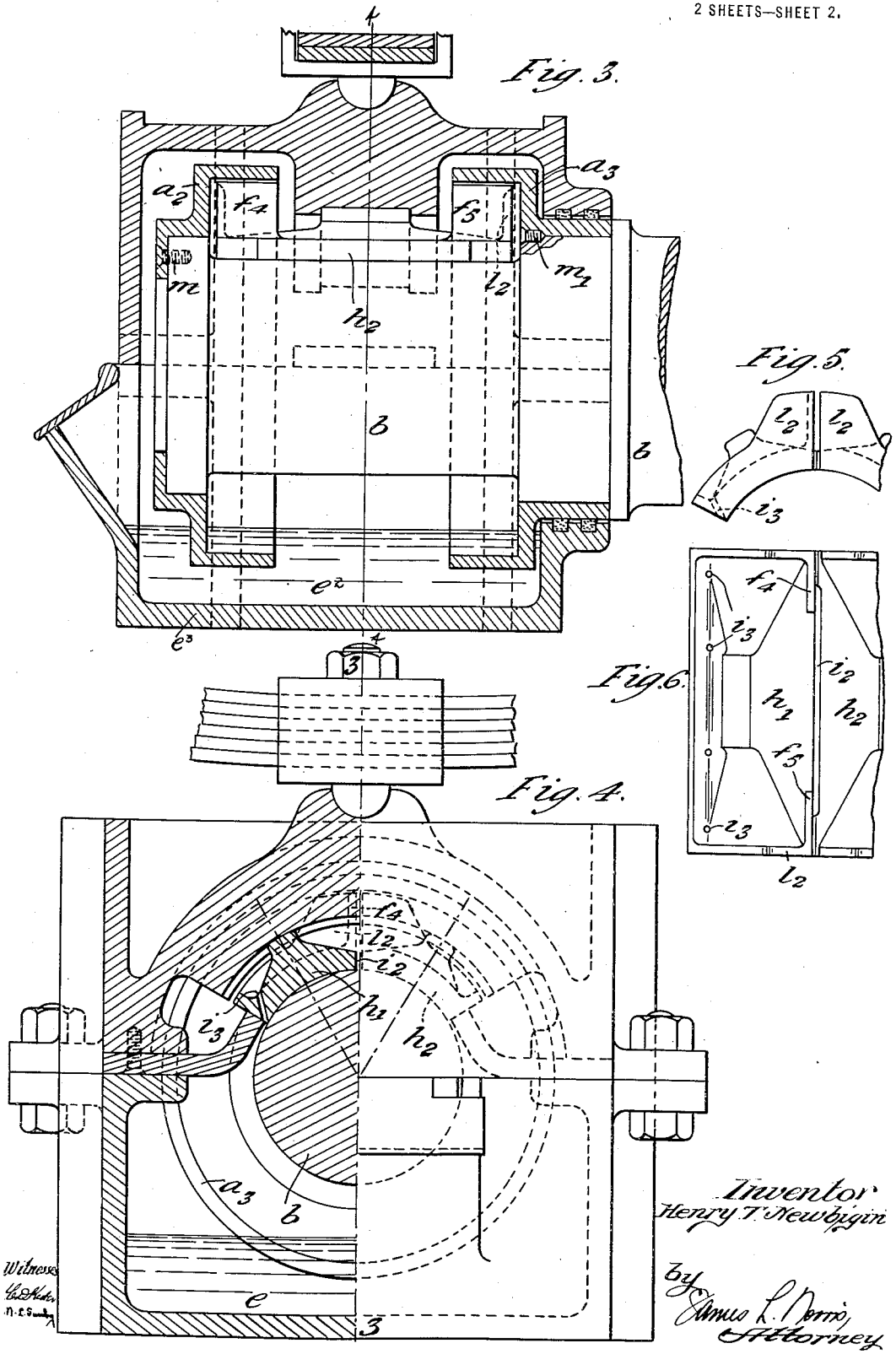

UNITED STATES PATENT OFFICE.

HENRY T. NEWBIGIN, OF NEWCASTLE-UPON-TYNE, ENGLAND.

LUBRICATION OF JOURNAL-BEARINGS.

1,336,373.

Specification of Letters Patent.   Patented Apr. 6, 1920.

Application filed November 21, 1918. Serial No. 263,569.

*To all whom it may concern:*

Be it known that I, HENRY THORNTON NEWBIGIN, a subject of the King of Great Britain, residing in Newcastle-upon-Tyne, England, have invented certain new and useful Improvements Relating to the Lubrication of Journal-Bearings, of which the following is a specification.

The invention relates to the lubrication of journal bearings of the rocking or yielding segmental type, as applied to horizontal or approximately horizontal shafts.

For this purpose rings are used which rotate with the shaft, the lower edges of the rings dipping into an oil well, the oil adhering to the rotating ring being scraped off by suitably disposed wipers and directed to feed journal bearings.

Shafts provided with segmental rocking or yielding bearings require copious lubrication and special provision is required to accomplish this purpose and according to the invention this is provided by forming the rotating rings with an inner projecting flange directed away from the bearing and an outer projecting flange within the bearing and external to the segments.

Passages may be provided in the segments, so that the oil in excess of that required for the lubrication of any element may pass on to the adjacent segment.

In a preferred construction, the rings are of Z section, the inner projecting flange being directed away from the bearing and the outer projecting flange being within the bearing and external to the segments.

The accompanying drawings show examples of constructions according to the invention. Figure 1 is a sectional elevation, of a journal bearing with oil scrapers, the portion on the left-hand side being a section through the central vertical line, and that on the right hand side a section through the line 1—1 of Fig. 2. Fig. 2 is a section on the line 2—2 of Fig. 1. Fig. 3 is a section of a journal bearing showing a modified arrangement of scrapers, the section being taken on the line 3—3 of Fig. 4 and Fig. 4 is a partial end elevation of the bearing in Fig. 3 and a partial end section on the line 4—4 of Fig. 3.

Figs. 5 and 6 show in end view and plan, respectively, details of the segments and scrapers shown in Figs. 3 and 4. Fig. 7 is a section showing the oil scraper illustrated in Fig. 1 provided with a lip; Fig. 7ª is a detail showing the lip of the scraper in Fig. 7; Fig. 8 is a section showing a part, as illustrated in Fig. 1, associated with a modified oil scraper having a lip; and Fig. 8ª is a detail showing the lip of the scraper illustrated in Fig. 8.

Figs. 1 and 2 illustrate the application of the invention to a journal bearing in which the load is mainly supported by the lower bearings and Figs. 3 and 4 to a journal bearing where, as in a railway axle box, the load is carried on the upper part of the bearing.

In all the figures lubricating rings $a$ and $a_1$ are mounted so as to rotate with the shaft $b$, which is supported on pivoted segments $h$. In the construction shown in Figs. 1 and 2 the rings are made in halves secured by the screws $c$, $c_1$; packing rings $d$ prevent any leakage of oil past the housings of the bearings.

Where the shaft is required to rotate in either direction, the oil may be scraped from one ring in one direction of rotation and from the other ring when the rotation is reversed, or from the inside of the ring in one direction of rotation and from the outside of the ring in the other direction of rotation. In some cases only one ring may be fitted.

In all cases the lower edges of the rings dip into an oil bath contained in the base $e$ of the housing $e'$ of the bearing.

In Figs. 1 and 2 the scrapers $f$, $f_1$ are shown as applied to the external surface of the rings $a$, $a_1$ and secured to the stops $g$, $g_1$ which prevent the rotation of the pivoted segments $h$. Oil passages $i$, $i_1$ allow the oil to have free access to the segments.

In the modification shown in Fig. 7 the scraper $f_2$ is provided with a lip $l$ (Fig. 7ª) to guide the oil in the required direction. Similarly the modified scraper $f_3$ shown in Fig. 8 is provided with a lip $l_1$ (Fig. 8ª) for the same purpose. The scraper $f_2$ is adapted to wipe the external surface of the ring and convey the oil to the surface of the shaft $b$; the scraper $f_3$ is adapted to wipe the internal surface of the ring and convey the oil to the shaft.

In the constructions shown in Figs. 3 and 4 the lubricating rings $a_2$, $a_3$ dipping into the oil bath in the base $e_2$ or the housing $e_3$ are secured by set screws $m$, $m_1$ to collars of the shaft $b$. Scrapers $f_4$, $f_5$ wipe the oil from the internal surfaces of the rings $a_2$, $a_3$; these scrapers are shown as integral with or connected to the pivoted bearing segments $h_1$ and $h_2$ bearing on shaft $b$.

Oil passages are provided as shown at $i_2$, $i_3$ in Figs. 4, 5 and 6, and the scrapers are provided with a guiding lip $l_2$.

Having thus described the nature of the said invention and the best means I know of carrying the same into practical effect, I claim:—

1. In a device for the lubrication of the journal bearings of a shaft, the combination of a housing formed with an oil well, a series of pivoted segments constituting the bearings and carried by the housing, a ring fixed to the shaft and provided with a flange dipping into the well and encircling terminal portions of the segments, and a scraper designed to remove the oil from one of the surfaces of the flange and direct it to the journal bearings, substantially as described.

2. In a device for the lubrication of the journal bearings of a shaft, the combination of a housing formed with an oil well, a series of pivoted segments constituting the bearings and carried by the housing, a pair of rings fixed to the shaft and provided with flanges dipping into the well and embracing the ends of the segments, and scrapers designed to remove the oil from one surface of the flanges and direct it to the journal bearings, substantially as described.

3. In a device for the lubrication of the journal bearings of a shaft, the combination of a housing formed with an oil well, a series of pivoted segments constituting the bearings and carried by the housing, a pair of rings fixed to the shaft and provided with flanges dipping into the well and embracing the ends of the segments, and scrapers designed to remove the oil from the inner surfaces of the flanges and direct it to the journal bearings, substantially as described.

4. In a device for the lubrication of the journal bearings of a shaft, the combination of a housing formed with an oil well, a series of pivoted segments constituting the bearings and carried by the housing, a pair of rings fixed to the shaft and provided with flanges dipping into the well and embracing the ends of the segments, and scrapers designed to remove the oil from the inner surfaces of the flanges, said flanges having lips adapted to direct the oil from the scrapers to the bearings, substantially as described.

In testimony whereof I have signed my name to this specification.

HENRY T. NEWBIGIN.